US011888881B2

(12) United States Patent
Meir et al.

(10) Patent No.: US 11,888,881 B2
(45) Date of Patent: Jan. 30, 2024

(54) CONTEXT INFORMED ABNORMAL ENDPOINT BEHAVIOR DETECTION

(71) Applicant: Palo Alto Networks, Inc., Santa Clara, CA (US)

(72) Inventors: Shai Meir, Tzur Yitzhak (IL); Dany Cohen, Tel-Aviv (IL); Arkady Miasnikov, Netanya (IL); Ohad Ohayon, Kadima-Zoran (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/931,253

(22) Filed: Sep. 12, 2022

(65) Prior Publication Data

US 2023/0007037 A1    Jan. 5, 2023

Related U.S. Application Data

(62) Division of application No. 16/557,549, filed on Aug. 30, 2019, now Pat. No. 11,483,326.

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/1416* (2013.01)

(58) Field of Classification Search
CPC . H04L 63/1425; H04L 63/1416; G06N 20/00; G06F 21/552; G06F 21/554
USPC .......................................................... 726/23
See application file for complete search history.

(56) References Cited

U.S. PATENT DOCUMENTS

| 6,708,291 | B1  |   | 3/2004  | Kidder                 |
|-----------|-----|---|---------|------------------------|
| 9,306,962 | B1  |   | 4/2016  | Pinto                  |
| 9,419,996 | B2  | * | 8/2016  | Porat ......... G06F 21/554 |
| 9,928,366 | B2  |   | 3/2018  | Ladnai et al.          |
| 9,967,265 | B1  |   | 5/2018  | Peer et al.            |
| 10,122,687| B2  | * | 11/2018 | Thomas ......... H04L 63/10 |

(Continued)

FOREIGN PATENT DOCUMENTS

| GB | 2564589 B    | 7/2019 |
|----|--------------|--------|
| WO | 2017019391 A1 | 2/2017 |

(Continued)

OTHER PUBLICATIONS

PCT Application No. PCT/US2020/048531, Written Opinion of the IPEA, dated Jul. 22, 2021, 8 pages.

(Continued)

*Primary Examiner* — Badri Narayanan Champakesan
(74) *Attorney, Agent, or Firm* — Gilliam IP PLLC

(57) ABSTRACT

Adaptive normal profiles are generated at a hierarchical scope corresponding to a set of endpoints and a process. Abnormal endpoint activity is detected by verifying whether event data tracking activity on the set of endpoints conforms to the adaptive normal profiles. False positives are reduced by verifying alarms correspond to normal endpoint activity. Abnormal event data is forwarded to a causality chain identifier that identifies abnormal chains of processes for the abnormal endpoint activity. A trained threat detection model receives abnormal causality chains from the causality chain identifier and indicates a likelihood of corresponding to a malicious attack that indicates abnormal endpoint behavior.

20 Claims, 10 Drawing Sheets

(56) References Cited

U.S. PATENT DOCUMENTS

| | | | | |
|---|---|---|---|---|
| 10,122,818 | B2* | 11/2018 | Wang | H04L 67/10 |
| 10,735,551 | B2* | 8/2020 | Wang | G06Q 50/01 |
| 10,929,258 | B1* | 2/2021 | Gauf | G06F 11/263 |
| 2003/0188189 | A1* | 10/2003 | Desai | H04L 63/104 |
| | | | | 726/23 |
| 2011/0301998 | A1* | 12/2011 | Talwar | H04L 41/00 |
| | | | | 709/224 |
| 2012/0304288 | A1* | 11/2012 | Wright | H04L 63/1425 |
| | | | | 726/22 |
| 2015/0135262 | A1 | 5/2015 | Porat et al. | |
| 2016/0072834 | A1* | 3/2016 | Bott | H04L 63/145 |
| | | | | 726/1 |
| 2016/0080419 | A1* | 3/2016 | Schiappa | H04L 63/1441 |
| | | | | 726/1 |
| 2016/0219066 | A1 | 7/2016 | Vasseur et al. | |
| 2016/0275289 | A1* | 9/2016 | Sethumadhavan | |
| | | | | H04L 63/0428 |
| 2016/0357966 | A1* | 12/2016 | Porat | G06F 21/566 |
| 2017/0093897 | A1* | 3/2017 | Cochin | H04L 63/145 |
| 2017/0244733 | A1 | 8/2017 | Wu et al. | |
| 2018/0018456 | A1* | 1/2018 | Chen | G06F 21/552 |
| 2018/0255076 | A1* | 9/2018 | Paine | H04L 63/1416 |
| 2019/0387399 | A1* | 12/2019 | Weinberg | H04L 63/1441 |

FOREIGN PATENT DOCUMENTS

| | | | | |
|---|---|---|---|---|
| WO | WO-2017019391 | A1* | 2/2017 | G06F 21/55 |
| WO | 2017214500 | A1 | 12/2017 | |

OTHER PUBLICATIONS

PCT Application Serial No. PCT/US2020/048531 International Search Report, dated Dec. 7, 2020, 3 pages.

PCT Application Serial No. PCT/US2020/048531 International Written Opinion, dated Dec. 7, 2020, 6 pages.

* cited by examiner

CONTEXT INFORMED ABNORMAL ENDPOINT BEHAVIOR DETECTION

BACKGROUND

The disclosure generally relates to the field of information security, and to modeling, design, simulation, or emulation.

In the context of monitoring a device or network of endpoint devices (hereinafter "endpoints"), malicious entities will exploit vulnerabilities in common system processes to deliver one or more stages of an attack. Examples of known attacks that exploit processes running in an operating system (OS) include process hollowing, doppelganger attacks, code injection, and using known process names. Often the attack can exploit a zero-day vulnerability, meaning that the network of endpoints is oblivious to the vulnerability being exploited while the attack is carried out.

BRIEF DESCRIPTION OF THE DRAWINGS

Embodiments of the disclosure may be better understood by referencing the accompanying drawings.

DESCRIPTION

Figure 1:
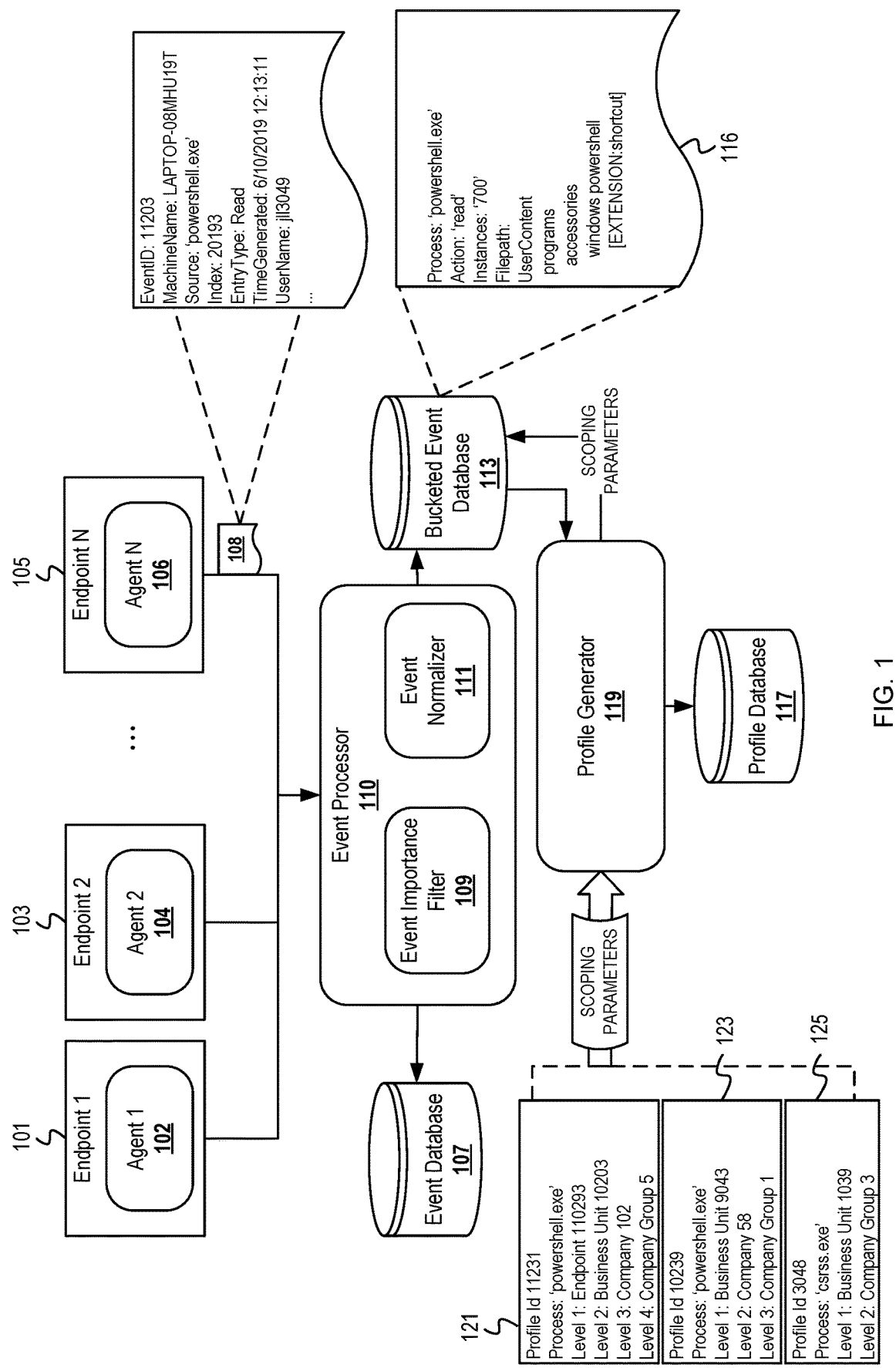
FIG. 1 is a conceptual diagram of a profile generator generating adaptive normal profiles.

The description that follows includes example systems, methods, techniques, and program flows that embody embodiments of the disclosure. However, it is understood that this disclosure may be practiced without these specific details. For instance, this disclosure refers to systems for endpoint security in illustrative examples. Aspects of this disclosure can be instead applied to cloud security, behavioral analytics, security information and event managements, Internet of Things (IoT) security and other types of network security. In other instances, well-known instruction instances, protocols, structures and techniques have not been shown in detail in order not to obfuscate the description.
Overview In the context of monitoring a network of endpoints in order to detect possible malicious behavior/attacks that exploit network vulnerabilities, it can be difficult to accurately identify threats without knowing the type or source of the attack (e.g., if the attacker uses a zero-day vulnerability). Any given process running on an endpoint in the network can generate thousands or millions of events that could potentially indicate an attack. Moreover, an event indicating abnormal behavior for an endpoint in one context could be a normal event for a similar endpoint in a different context. Generic threat detection methods suffer from an overabundance of false positives—events identified as malicious that are not malicious for a given endpoint.

A security framework has been developed that can consume a high volume of events from numerous devices and process the events to generate profiles that capture "normal" behavior despite the meaning of "normal" being adapted to a specific context, while increasing accuracy in flagging abnormal process behavior. The security framework includes a component, which is referred to herein as a profile generator, that creates this "adaptive normal profile" based on behavior/activity at different scopes—individual endpoint scope and at least one scope encompassing more than one endpoint. This adaptive normal profile is generated and maintained based on common events observed at the endpoints running the process. To account for the variability of normal in the profiles, event data is filtered and aggregated in several steps starting with agents deployed on the endpoints themselves ("endpoint agents") filtering and then aggregating the event data from a single endpoint. The endpoint agents forward the filtered and aggregated event data to a database. This filtered and aggregated event data can be further filtered by importance qualifiers depending on the significance of the relevant processes and endpoints (e.g., is the process indicated as high value, is the device deployed in a high security environment). The filtered and aggregated event data is normalized by an event normalizer. The event normalizer converts the event data into a standardized, bucketed format that groups events from distinct endpoints into the same bucket if they are functionally similar or identical (e.g., if the events correspond to the same process running on distinct endpoints).

Using the bucketed events, adaptive normal profile generation for a process occurs across multiple hierarchical levels of endpoints. These hierarchical levels can correspond to business units, companies, groups of companies, etc., for which the process to be profiled displays similar behavior. At each hierarchical endpoint level, event data is collected from the bucket representing the process. Based on a statistical analysis of the event data, frequent events corresponding to that hierarchical endpoint level are added to the adaptive normal profile. The resultant adaptive normal profile comprises a set of normal events for the process.

In order to implement the adaptive normal profiles for detecting abnormal events occurring at endpoints and to reduce the number of false positives, a monitoring component of the security framework is configured to receive alarms from preexisting endpoint security systems and process activity generated from endpoints. Activity corresponding to alarms generated by endpoint security systems or process activity at the endpoints is verified to conform to adaptive normal profiles having a same context as the endpoint security systems and endpoints generating the process activity. Any detected abnormal profile activity can be indicated for further analysis by a domain-level expert.

For most malicious attacks corresponding to abnormal endpoint behavior, the attack comprises a chain of processes, each process in the chain initiated by another process, with the possible exception of seed processes that can be initiated by a bootup or user command. Initiation occurs when an existing process receives a command or an uninitiated process receives instructions to begin process execution. Process activity comprising event data from endpoints or indicators of processes being initiated are not classified as malicious or benign until the monitoring component performs a behavioral analysis of the process activity (i.e., the execution of processes once initiated). The monitoring component makes use of the adaptive normal profiles to identify abnormal behavior for individual processes, and subsequently uses identification of individual abnormal processes to identify chains of processes.

For the purposes of detecting malicious behavior for a chain of processes, a threat detection model can be trained based on either synthetic or real-world data corresponding to malicious causality chains. The real-world causality chains can be generated using the adaptive normal profiles to determine which events are malicious. A causality chain identifier then detects the underlying directed graph structure of the processes and identifies which events may comprise a causality chain (i.e., a directed path). This underlying directed graph structure corresponds to processes initiating other processes, where the processes are the nodes in the graph and initiating another process is a directed arrow. The causality chains used to train the detection model can include metadata related to the events to increase the model complexity and accuracy of the threat detection model. The threat detection model can be a simple probabilistic model or a complex machine learning based model depending on the available computing resources, the amount event data, etc. Once trained, the threat detection model receives chains of possible malicious events identified by the adaptive normal profiles as well as associated event metadata and determines whether a malicious causality chain is present with high likelihood.

Example Illustrations

FIG. 1 is a conceptual diagram of a profile generator generating adaptive normal profiles. Agent 1 102, agent 2 104, and agent N 106 are embedded on endpoint 1 101, endpoint 2 103, and endpoint N 105 respectively. The embedded agents 102, 104, and 106 generate event data and send the event data to event processor 110. In this illustration, the agent N 106 on endpoint N 105 detects event data 108 and sends the event data 108 to the event processor 110. The event processor 110 sends the event data to event database 107 for future use. The event processor 110 also comprises an event importance filter 109 and an event normalizer 111 that process the event data into bucketed event data that the event processor 110 sends to a bucketed event database 113. In response to a query of scoping parameters such as scoping parameters 121, 123, and 125, a profile generator 119 accesses the bucketed event database 113 in order to generate adaptive normal profiles. The profile database 117 stores the generated adaptive normal profiles corresponding to the scoping parameters.

Endpoint 1 101, endpoint 2 103, and endpoint N 105 can be any type of computing device having external communication. For example, the endpoints can be a computer in communication with a corporate network, a processor on a server in communication with other processors, a phone in communication with a wireless network, an IoT device in communication with a wireless network, etc. Agent 1 102, agent 2 104, and agent N 106 monitor processes running on endpoint 1 101, endpoint 2 103, and endpoint N 105 respectively. The agents can be software running on the endpoints or a separate device. The agents generate event data based on the occurrence of events corresponding to monitored processes on the endpoints. The event data 108 comprises an event ID 11203, a machine name LAPTOP-08MHU19T, a process name 'powershell.exe,' an index 20193, an entry type 'read,' an event time Jun. 10, 2019 12:13:11, and a username j113049. Further attributes indicating other processes initiated by an event, event importance qualifiers, etc. can be present in event data. In this instance, the endpoint being monitored is a laptop and the process being monitored is 'powershell.exe' performing an instance of a read activity. The agents 102, 104, and 106 can subsample events occurring on the endpoints 101, 103, and 105. This subsampling can be related to an importance qualifier for a corresponding process, a predetermined constant rate of subsampling, a preconfigured subsampling rule, etc.

Event processor 110 receives event data from the agents 102, 104, and 106. The event processor 110 can filter and aggregate the event data before storing it in the event database 107. The filtered and aggregated event data can be further processed by event importance filter 109 and event normalizer 111 to create bucketized event data that the event processor 110 stores in the bucketed event database 113. The event importance filter 109 filters events based on an event importance qualifier and can also use prior knowledge about malicious event types to filter out events that are either not important for endpoint security or are unlikely to correspond to malicious attacks.

The event normalizer 111 comprises a model that takes as input event data and outputs an event bucket from a set of event buckets along with key event attributes extracted from the output event bucket, or if the input event data doesn't correspond to an event bucket the model outputs the event data and an indicator that the event data doesn't correspond to a bucket. The key event attributes are attributes that identify the event and are used for determining its importance, for instance an importance qualifier, a process indicator that initiated from the event, event scope data, etc. The model for the event normalizer 111 is described in greater detail in the description for FIG. 4.

An example bucket 116 indicates a process 'powershell.exe,' a file path UserContent/programs/accessories/windows/powershell/[EXTENSION:shortcut], a type 'read,' and a number of instance '700'. The file path suffix [EXTENSION:shortcut] specifies that the file path for an event stored in this bucket will read a shortcut extension in the given file path. The bucketed event database 113 can include a hash-based lookup for the event attributes. Further, the buckets are hierarchical in scope. For the above example, the given bucket 116 corresponds to business unit 10203, company 102, and company group 5. A second bucket containing the given bucket 116 can correspond to company 102 and company group 5, and a third bucket containing the example bucket 116 and the second bucket can correspond to only company group 5. Thus, a lookup operation for an event bucket first looks up the hash corresponding to event attributes and then proceeds down a hierarchical scope tree to access the event bucket.

The profile generator 119 receives scoping parameters 121, 123, and 125 as input to begin adaptive normal profile generation. Adaptive normal profile generation proceeds by querying the bucketed event database 113 for events contained in buckets of varying scopes. For example, the scoping parameters 121 specify a process 'powershell.exe,' an endpoint 110293, a business unit 10203, a company 102, and a company group 5. The profile generator 119, after receiving the scoping parameters 121, queries the bucketed event database 113 for events corresponding to process 'powershell.exe' and endpoint 110293. The bucketed event database 113 sends a first batch of events corresponding to the query, and the profile generator 119 runs a statistical analysis on the first batch of events to identify normal events. This can be a simple frequency analysis to detect normal events for the endpoint 110293. More complex behavioral statistical models can be used to distinguish between normal and abnormal events. The models can incorporate known normal events using expert domain knowledge. Once a basic profile using only data for endpoint 110293 has been created, the profile generator 119 queries the bucketed event database 113 for a second batch of events corresponding to the process 'powershell.exe' and the business unit 10203. The profile generator 119 runs another statistical analysis on the second batch of events to identify normal events for the business unit 10203. This statistical analysis can be identical to the statistical analysis for the first batch of events or can be modeled to capture broader statistical patterns for broader scopes (i.e. a model can underfit the data compared to narrower scopes). The first set of normal events for the first batch of events and the second set of normal events for the second batch of events are merged and pruned using prior knowledge about the endpoint 110293 and the business unit 10203. For example, a known common event for the business unit 10203 that cannot occur on the endpoint 110293 can be pruned. The above-described process of querying for a batch of events, identifying normal events, and merging the set of normal events with the previous set of normal events is applied at every scope given in the scoping parameters 121. Once adaptive normal profile generation is complete, the profile generator 119 stores a resultant adaptive normal profile in the profile database 117.

Figure 2:
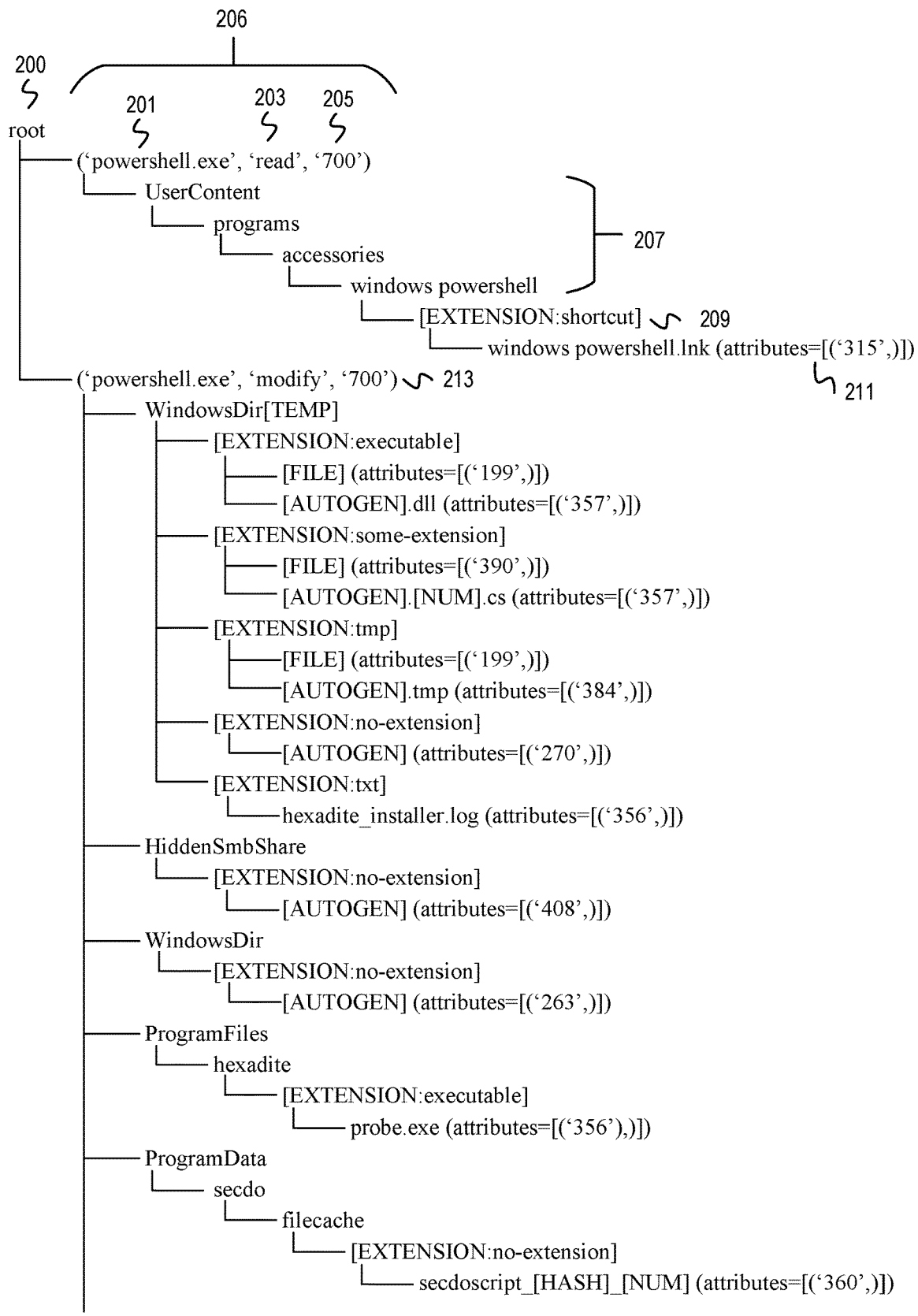
FIG. 2 depicts an example adaptive normal profile.

FIG. 2 depicts an example adaptive normal profile, for example as generated by profile generator 119 with reference to FIG. 1. The adaptive normal profile comprises a directory type structure starting with a root 200. Below the root 200 is an event classifier 206 comprising a process name 'powershell.exe' 201, an event type 'read' 203, and a number of unique instances '700' 205. An adaptive normal profile corresponds to a single process, as reflected in a second event classifier 213 that still comprises a process name 'powershell.exe' but corresponds to an event type 'modify.' Each child entry below root indicates the process represented by the adaptive normal profile, a different event type, and instances of that event type. At the next level below the classifier level, there are one or more entries indicating a particular path of a target (e.g., file or object) upon which the process has performed the event. Instead of identifying each target upon which the process acted, the child entries below or within the path entry indicate a generalization of the target with an indication of target type, which in this case is an extension (e.g., executable, tmp, txt). Below the event classifier 206 is a file path 207 comprising a top node UserContent and subsequent nodes programs, accessories, and windows powershell respectively. Each label for a node in the file path corresponding to a subdirectory is hereinafter referred to as a "file path element." Due to the directory type structure of the file path 207, each node having a sub node in the file path 207 can have additional sub nodes as illustrated later in the profile. A target 209 specifies that an event in the bucket comprising the process 201, the event type 203, the file path 207, and the target 209 will perform a read operation on a shortcut extension in the file path 207. Additional target metadata 211 specifies that the read operation is performed on the windows powershell.lnk file and that the target has an attribute with value 315. The adaptive normal profile depicted supports access of the attributes corresponding to any event contained therein. An event can have a "context" corresponding to its event classifier 206 corresponding to a particular scope of endpoints (not indicated in the profile in FIG. 2). For example, a context could be the process name 'powershell.exe' 201, the event type 'read' 203, the number of unique instances '700' 205, and a set of endpoint identifiers. The adaptive normal profile can include contextual information resulting from processes interfacing with various elements of a system and/or corresponding to events. As examples, the contextual information can correspond to a process interfacing with a file system, a registry, or a network; an (binary) image load event a command line event, an application programming interface (API) call; a user action; and an operating system assigned integrity level.

Figure 3:
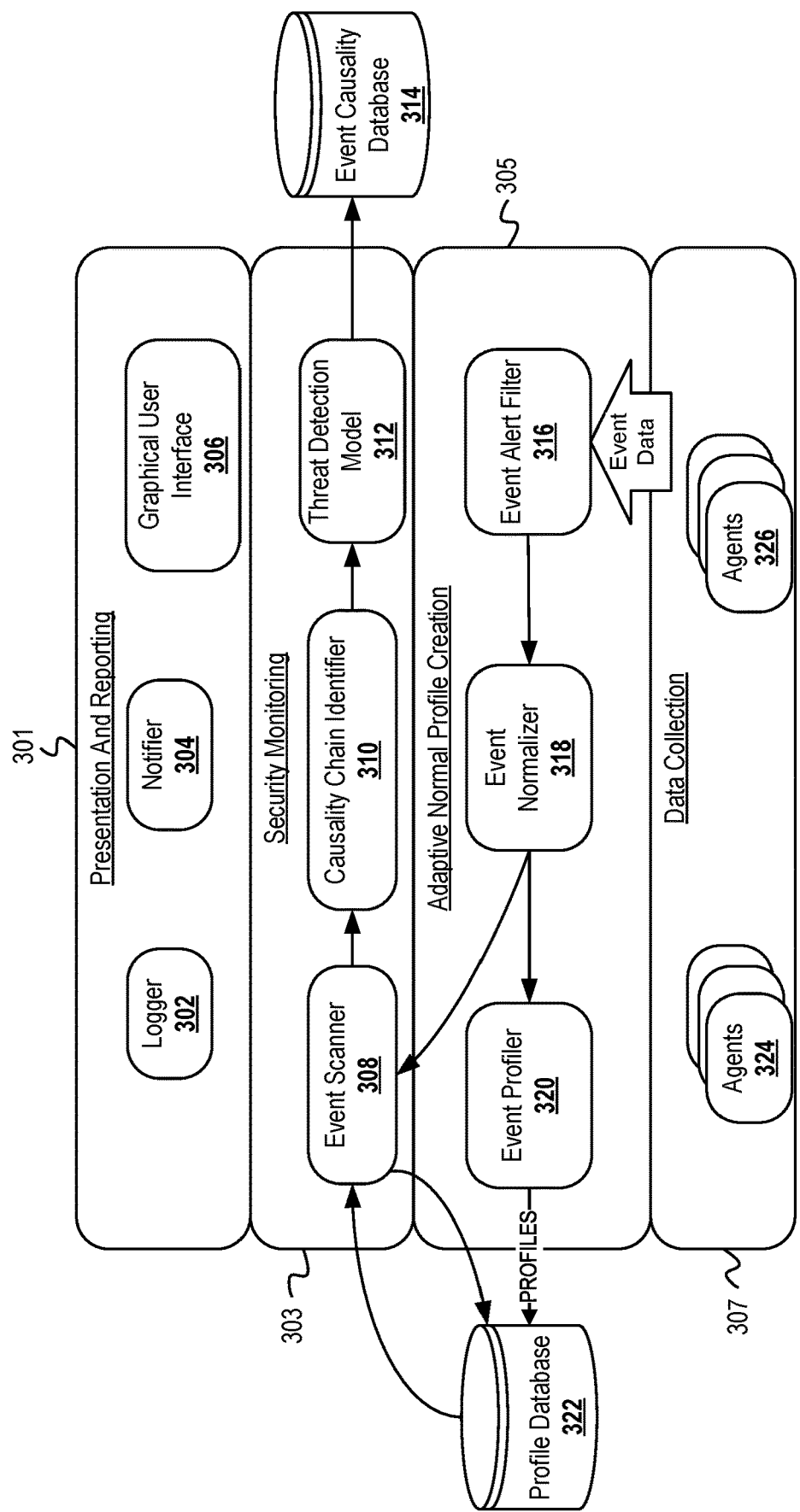
FIG. 3 is a conceptual diagram of deployment of a malicious behavior detection system.

FIG. 3 is a conceptual diagram of a malicious behavior detection system as a stack of operational domains. The malicious behavior detection system comprises four primary operational domains: presentation and reporting 301, security monitoring 303, adaptive normal profile creation 305, and data collection 307. The operations being performed can occur simultaneously using various components of the malicious behavior detection system and components can interact with distinct components from separate operational domains.

For presentation and reporting 301, a logger 302 receives reports of malicious causality chains from a threat detection model 312 and records logs corresponding to the malicious causality chains for user access. A notifier 304 can also receive the reports of malicious causality chains and sends an indication of a malicious attack to a graphical user interface 306. The graphical user interface 306 displays a report of each malicious causality chain to a user for analysis. The graphical user interface 306 also allows a user to initiate adaptive normal profile creation by querying an event profiler 320, access logs of malicious causality chains, etc.

For security monitoring 303, an event scanner 308 receives batches of incoming events from an event normalizer 318. For each process indicated in the batch of events, the event scanner 308 retrieves the corresponding profile from a profile database 322. The events in the batch are verified against the profiles and any events flagged as abnormal (i.e., not indicated in the profiles) are forwarded to a causality chain identifier 310. Using the flagged events forwarded from the event scanner 308, the causality chain identifier 310 creates a directed graph structure for processes by adding a directed arrow from a first process to a second process if a flagged event of the first process triggered an event of the second process or if an event of the second process triggered an event of the first process. The causality chain identifier 310 then identifies candidate malicious causality chains using this directed graph structure and forwards the candidate malicious causality chains to a threat detection model 312.

The threat detection model 312 receives candidate malicious causality chains comprising event data for each event in the candidate malicious causality chain. This set of event data is input to the threat detection model 312 which outputs a metric indicating the likelihood that the candidate malicious causality chain is malicious. If the metric is above a threshold, the threat detection model 312 sends the candidate malicious causality chain to the event causality database 314 and to the logger 302 and notifier 304. The threat detection model 312 is pretrained on either synthetic or real-world causality chains (or both). Real-world causality chains can be generated using the trained profiles from profile database 322 in combination with feedback from analysts who identify malicious causality chains from flagged events using the trained profiles. Alternatively, past causality chains corresponding to known malicious attacks can be used. Synthetic causality chains can be generated by simulating known attacks in a controlled environment. The format for training data for threat detection model 312 is the malicious (and benign) causality chain data, and additional data for each event in the chain comprising event severity indicators and metadata including domain-level features from an expert, labels from a firewall/network intrusion prevention system/antivirus program, etc. The threat detection model 312 can be a neural network used for classification with a log loss function corresponding to a probability that the input causality chain is malicious. The choice of neural network and its architecture depends at least on the expected types of malicious attacks and the amount of available training data. The neural network can be trained over several batches of training data using any number of standard optimization methods. To exemplify, a standard neural network for threat classification can be a convolutional neural network optimized using batches of training data, trained with automatic differentiation on the derivative of the loss function, where internal node connections are randomly dropped over various batches of training data using dropout. In other embodiments, the threat detection model 312 can comprise various other machine-learning based classification models, for example gradient boosting methods, support vector machine classifiers, regression models, etc.

Adaptive normal profile creation 305 begins when an event alert filter 316 receives event data from agents 324 and 326 after an event processor filters and aggregates the event data. The event alert filter 316 determines, using event importance qualifiers, whether the event corresponds to an alert and sends batches of event data associated with an alert to the event normalizer 318. The event normalizer 318 associates the batches of event data with a set of event buckets as described variously above and sends the batches of event buckets to the event profiler 320. The event profiler 320 creates profiles based on scoping parameters receives from the graphical user interface 306.

Figure 4:
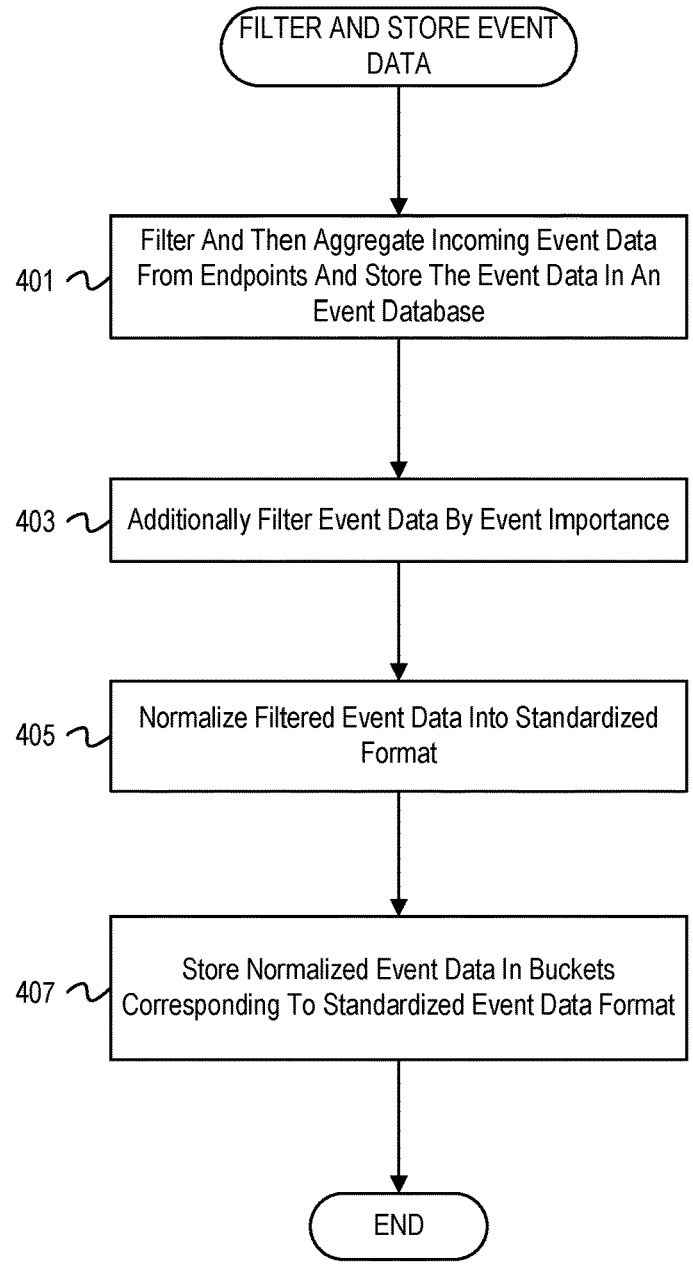
FIG. 4 is a flowchart of example operations for filtering and storing event data using a bucketed event database.

FIG. 4 depicts a flow diagram of example operations for filtering and storing event data. The description of FIG. 4 refers to an "event processor" as performing the example operations for consistency with the earlier description. Naming or labeling of programs can be arbitrary, as well as modular organization of a program.

At block 401, an event processor filters and aggregates incoming event data from endpoints and stores the event data in an event database. Although described as filtering and then aggregating, the event processor can alternately filter and aggregate event data several times. The filtering can subsample event data at a constant rate depending on a process and endpoint that creates the event data or based on a subsampling function also specific to the process and endpoint. Aggregation can occur across event data displaying substantially similar characteristics, e.g., statistically similar or identical events can be compressed into a single representative event. To exemplify, events with nearly identical attributes can occur with different but sequential time stamps and can be aggregated to a first representative event with an earliest time stamp.

At block 403, the event processor additionally filters event data by event importance. The event processor can determine event importance using an importance qualifier generated by an agent on an endpoint and indicated in the event data. This importance qualifier can alternatively be generated by the event processor. The agent or event processor can generate the importance qualifier by identifying common events in previous malicious causality chains corresponding to known attacks at the endpoint. The agent or event processor can identify events that have a greater impact on major processes running on the endpoint. Event data having a low importance as indicated by the importance qualifier is filtered out.

At block 405, a component of the event processor normalizes filtered event data into a standardized event data format. For consistency with the earlier description, we refer to this component as an event normalizer. The event normalizer determines from the event data known file path elements, file extensions or file types, and events with a file path element or file name that was likely randomly generated. This determination can be considered as three phases of operation to bucketize the event data. The first phase bucketizes event data elements with common process file paths known from domain expertise. The second phase bucketizes event data elements by file type. The third phase determines whether a file name and/or file path of an event data element resulted from random name generation.

During the first phase, the event normalizer sends a file path indicated in the event data to a parser. The parser is trained to identify common file path elements for major processes running on endpoints for which event data is received. The parser can be configured by an expert using domain knowledge of how the file paths are labelled across endpoints. For example, in a Windows® operating system, a known file path that includes 'C:\Windows' can be organized into a same bucket as a file path that includes 'D:\Windows'. Subdirectories from distinct endpoints can be identified as having the same functionality. The parser can maintain an index of associated file path elements (along with a particular choice of file path element being standard) identified as having the same functionality and can replace file path element names in the file path with a standard file path element name. The parser can receive multiple delimiting formats between file names in the file paths, for example forward slashes and backward slashes. The parser can additionally be configured to identify a type of file path and determine whether the file path is valid for the identified type.

During the second phase, the event normalizer sends the event data to the parser to determine a file type for the event data. The parser can extract key words at certain placeholders in the file path that correspond to known file types. For example, a file path can have a file name 'windows powershell.lnk' and the parser can be configured to indicate, based on this file name, that the file path corresponds to a link file type. The parser can be configured, using expert domain-level knowledge of file paths, to identify non-standard, domain-specific file types. For example, a file name 'file.myapp' can have a domain-specific file name extension 'myapp' that indicates the file runs a user-specific application and the parser can be configured to recognize this file name extension for file paths specifically from this domain. The file type comprises an additional event bucket to the bucket corresponding to the elements in the file path identified in the first phase. The bucket indicating elements and the bucket indicating a file type can be synthesized into a single bucket, as depicted in FIG. 2.

During the third phase, the event processor sends the file path associated with the event data to a statistical model to determine whether the file name or any elements of the file path not identified in the first phase is randomized. These statistical models are trained on file path elements (or, in some embodiments, a language) and can predict a likelihood that the file path element is randomly generated. Typical models predict the probability of a subsequent character given the character in the file path. File path elements (sometimes separated by a delimiter such as a forward slash)

can be analyzed by the statistical model individually. Stepwise probabilities (i.e. the probability of seeing a character given a previous character) enable the calculation of the likelihood of an observed file path element. The models then determine a threshold likelihood above which to determine that a file path element is not randomized. To exemplify, the statistical model can be a hidden Markov model with a hidden state sequence $X=\{X_i\}_{i=1}^n$ of hidden states, and an observation sequence $Y=\{Y_j\}_{j=1}^n$ of characters in a file path element. The probability of observing the sequence Y (i.e., the likelihood the file path element is not randomized) is precisely $P(Y)=\Sigma_X P(Y|X)P(X)$, where the sum runs over all possible hidden state sequences X, and the probabilities are predicted by the hidden Markov model. This probability can be tractably computed using, for instance, the forward algorithm. The HMMs can be trained on language-specific data corresponding to the language of file path elements, and multiple statistical models can be implemented for different file paths having different languages. Although depicted as a Hidden Markov Model, any statistical model that estimates the likelihood of a given character sequence can be used.

If, during the third phase, a file path element is determined to be randomized (i.e. the likelihood of the file path element given by any of the above models is above a likelihood threshold), a bucket is not created for this file path element or, in other embodiments, a bucket corresponding to randomized file path elements is used. File path elements that are not randomized (i.e. the likelihood of the file path element is below the likelihood threshold) are assigned a new bucket for that file path element. Any new buckets created in this phase can again be synthesized with buckets created in the first and second phase. This synthesis can incorporate the hierarchical structure of file path elements when combining the buckets created in the first and third phase.

At block 407, the event processor sends the normalized event data to a bucketed event database. The bucketed event database stores the normalized event data in the form of event metadata contained in the event data in a bucket corresponding to the standardized event data. The bucketed event database can be indexed by both buckets corresponding to file paths and hierarchical endpoint scopes. Thus, a query to the bucketed event database comprises a file path and hierarchical endpoint scope and a lookup operation traverses a tree structure in both the file path index and the hierarchical endpoint scope index.

Figure 5:
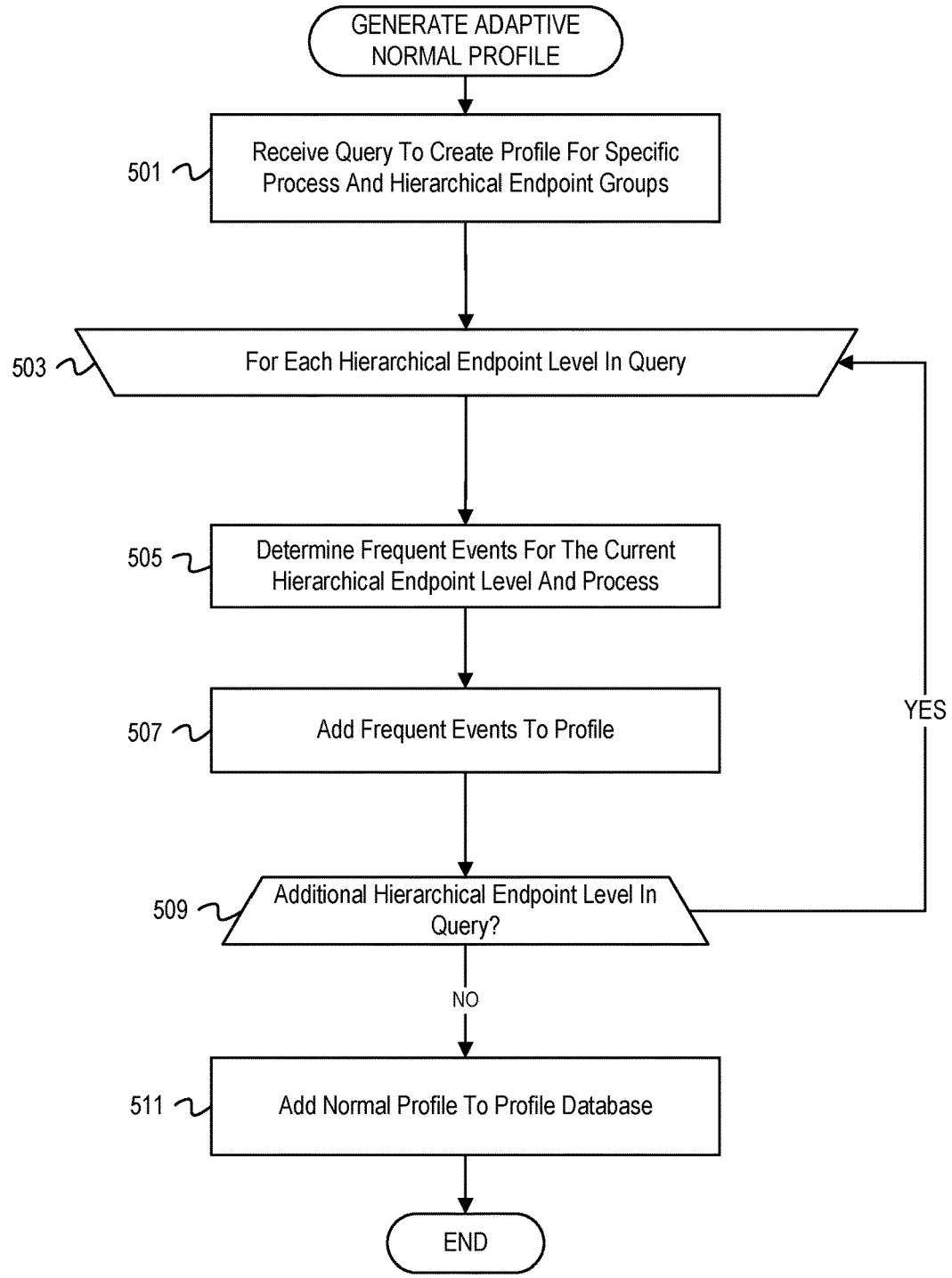
FIG. 5 is a flowchart of example operations for generating an adaptive normal profile.

FIG. 5 is a flowchart of example operations for generating an adaptive normal profile. The description of FIG. 5 refers to a "profile generator" as performing example operations. As previously mentioned, a program name can be arbitrary.

At block 501, a profile generator receives a query to create an adaptive normal profile for a specific process and a set of hierarchical endpoint groups. The query includes scoping parameters that specify hierarchical endpoint levels from which to create the adaptive normal profile.

At block 503, the profile generator begins iterating over the hierarchical endpoint levels indicated in the query. The profile generator can iterate through hierarchical endpoint levels in an arbitrary order, although in some embodiments database access will be more efficient when iterating from the narrowest to the broadest hierarchical endpoint levels. The loop of operations includes example operations at blocks 505 and 507.

At block 505, the profile generator determines frequent events for the current hierarchical endpoint level and process. The profile generator aggregates event data across a current hierarchical endpoint level corresponding to the process. The profile generator accesses a bucketed event database and queries the database according to the current hierarchical endpoint level. The database sends the profile generator a batch of frequent events corresponding to the current hierarchical endpoint level, unless there are no frequent events for the current hierarchical endpoint level.

At block 507, the profile generator adds the frequent events to a current profile or, if no profile exists, initializes an empty profile and adds the frequent events. The profile generator can maintain a directory structure in the profile in order to sort the frequent events. The directory structure should reflect the file paths given for the events. Each folder in a file path should be represented in the directory structure and folders contained inside other folders (i.e., folders coming after other folders in a file path) should be indexed under the containing folder. This directory structure is illustrated by the example profile given in FIG. 3. In some instances, a frequent event may never occur on the endpoint or set of endpoints corresponding to the current profile. This occurs when the frequent event was determined from a larger hierarchical scope than the scope of the current profile. The profile generator can determine whether each frequent event can occur on the endpoint or set of endpoints and can discard frequent events that cannot occur.

At block 509, the profile generator determines whether there is an additional hierarchical endpoint level indicated in the query. If there is an additional hierarchical endpoint level, control returns to block 503. Otherwise, control proceeds to block 511.

At block 511, the profiles generator adds the adaptive normal profile created by the operations of blocks 503, 505, 507, and 509 to a profile database. The adaptive normal profile can be indexed by the levels of hierarchical scope indicated in the profile.

While the example operations in FIGS. 4 and 5 presume indiscriminate collection of event data or process activity, either of data collection and adaptive profile creation can be targeted or prioritized to specified processes (e.g., processes considered most vulnerable or most attractive to attackers). For the data collection, this may be a part of the filtering performed by agents as described in the example operation of block 401 of FIG. 4.

Figure 6:
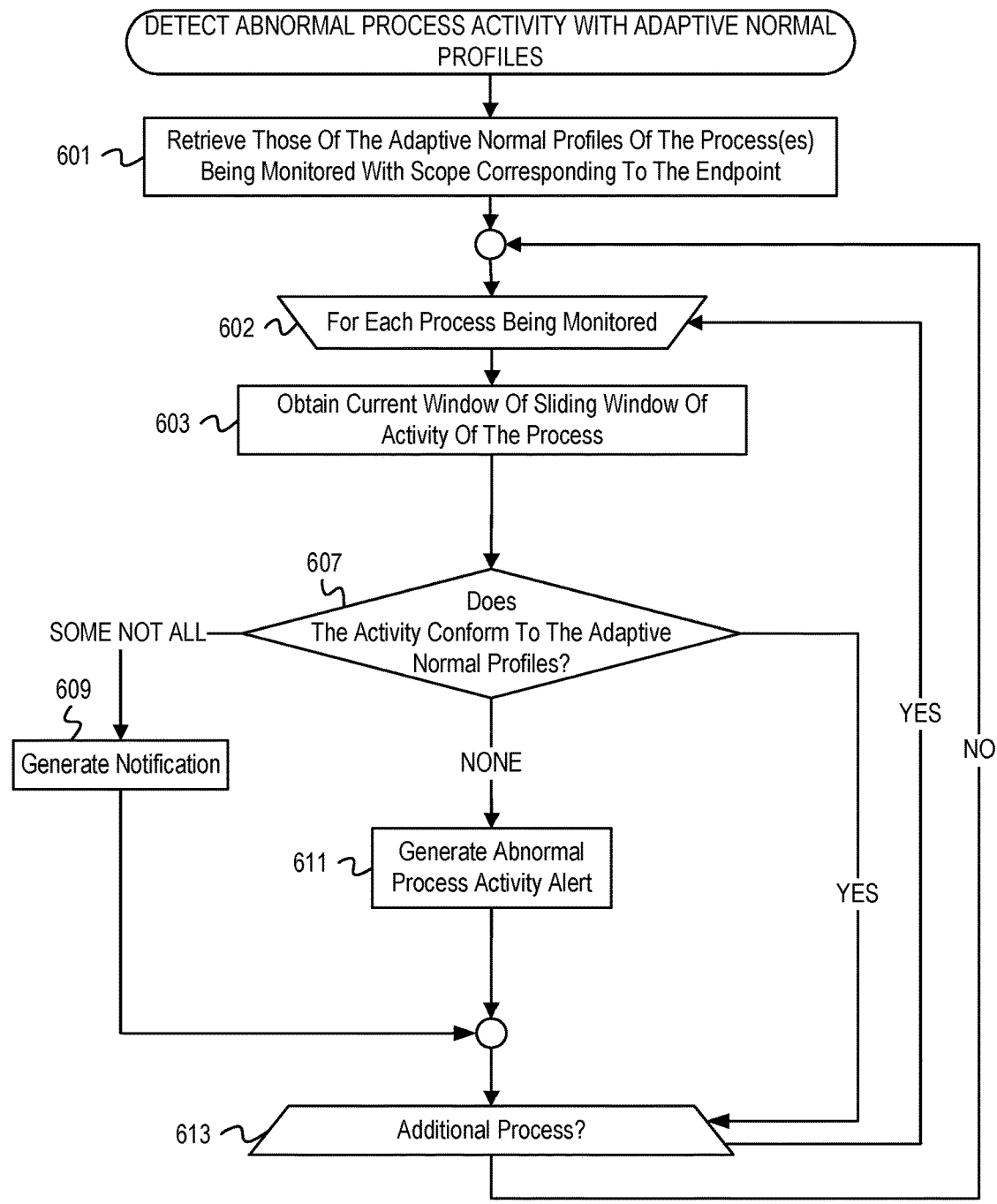
FIG. 6 is a flowchart of example operations for detecting abnormal process activity with adaptive normal profiles.
Figure 7:
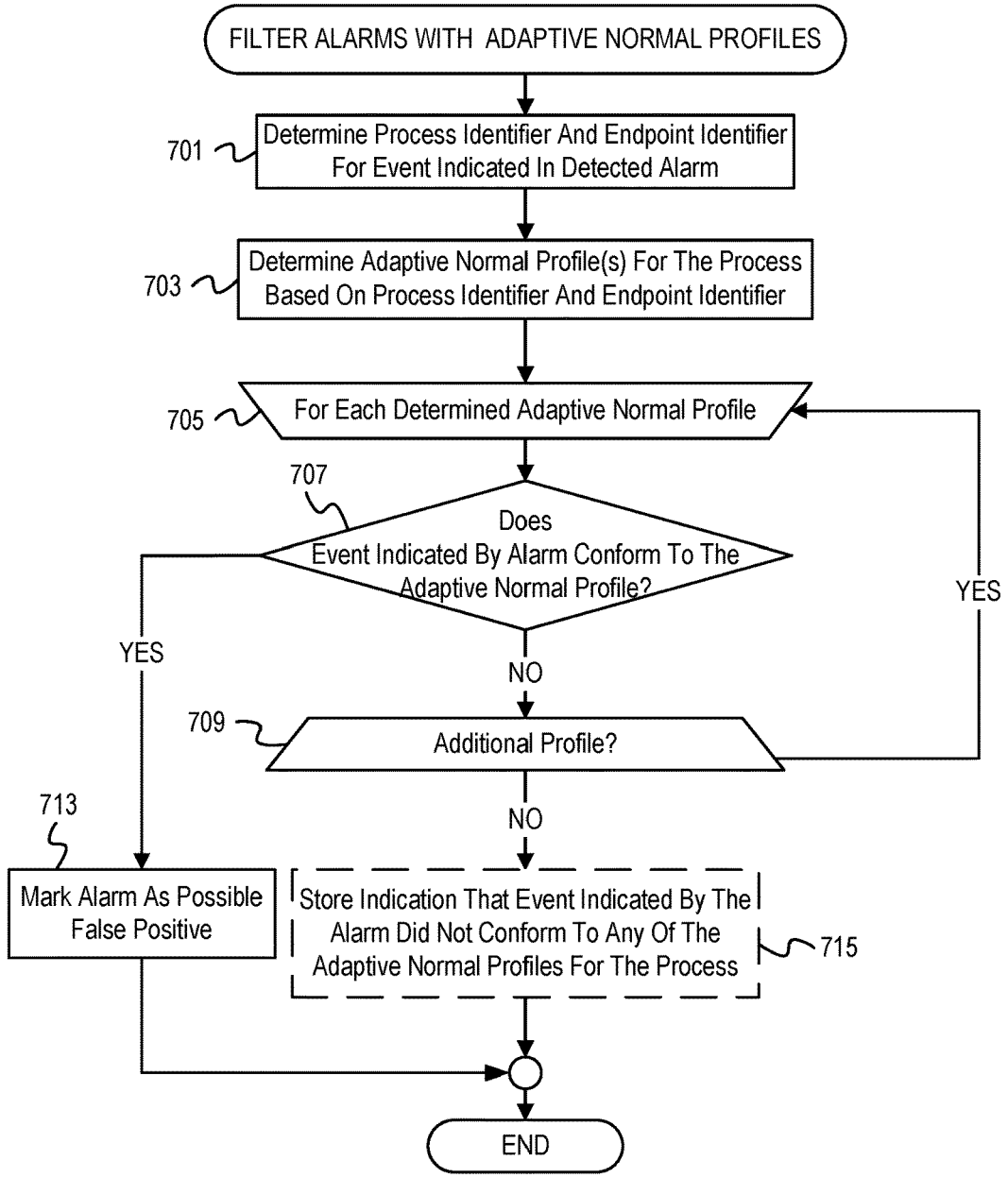
FIG. 7 depicts a flowchart of example operations for filtering alarms with adaptive normal process profiles.

The description of FIGS. 6-7 refers to a "security monitor" as performing example operations for consistency with previous descriptions. As previously mentioned, a program name can be arbitrary. FIG. 6 is a flowchart of example operations for detecting abnormal process activity with adaptive normal profiles. A security monitor can run on a centralized security system, a backend server, an agent monitoring an endpoint, etc. The detection of abnormal process activity from the large volume of process activity allows limited security resources to focus on this activity instead of normal activity and increases the likelihood of detecting new or previously undetected threats/attacks.

At block 601, the security monitor retrieves those of the adaptive normal profiles of the process with a scope corresponding to an endpoint or multiple endpoints on which the process is running. The security monitor queries a profile database with a process identifier and scoping parameters that includes the endpoint(s). The profile database can return multiple adaptive profiles having multiple hierarchical scopes corresponding to the endpoints running the process. For example, endpoints in distinct business units both running the process can correspond to distinct adaptive normal profiles having hierarchical scopes for each business unit. The profile database can be a remote database or a database running on local memory (e.g., when the security monitor is running on a monitoring agent at an endpoint). The profile database can be configured to retrieve all adaptive normal profiles corresponding to a set of endpoints efficiently, without backtracking to previously retrieved adaptive normal profiles.

At block 602, example operations for monitoring a process proceed as indicated by blocks 603, 607, 609, 611, and 613. The flowchart in FIG. 6 depicts the operations in blocks 603, 607, 609, 611, and 613 as being performed for a single process in each iteration, however these operations can occur for multiple processes simultaneously depending upon implementation (e.g., a multi-threaded processor, prioritization of processes, etc.). Components performing each block can receive activity corresponding to multiple processes running on multiple endpoints independently of other components also evaluating process activity.

At block 603, a security monitor obtains a current window of a sliding window of an activity of the process. The sliding window comprises a stream of event data coming from an agent monitoring an endpoint that is running the process. The sliding window can be an event log in memory on the security monitor that temporarily stores serialized event data in chronological order. There can be multiple event logs for multiple endpoints running natively on monitoring agents for each endpoint, running in a centralized server, etc. The current window is a snapshot of the sliding window comprising event data for events occurring over a time interval. The security monitor can retrieve the current window by accessing serialized event data within a time interval from the event log(s).

At block 607, the security monitor evaluates the obtained process activity against the retrieved adaptive normal profiles to determine whether to generate a notification or an alert. The security monitor iterates over the obtained event data and for each activity searches the retrieved adaptive normal profiles for a matching indication of the activity type (e.g., modify, read, etc.). With a matching activity type, the security monitor then searches for a matching target descriptor (i.e., path and target type or target identifier). If a matching entry is discovered, then the event can be disregarded as normal behavior. The security monitor can search the retrieved adaptive normal profiles in any order (e.g., largest scoped to smallest scoped profile). In some embodiments, the security monitor only makes a binary distinction between finding and not finding an event in one of the retrieved adaptive normal profiles. If found, the process activity is normal. If not, then it is treated as abnormal process activity for that process and target descriptor. In this example illustration, the security monitor has three outcomes of the evaluation. The event or activity of a process conforms with all of the retrieved profiles, none of the retrieved profiles, or some of the retrieved profiles. Thus, even when a match is found in a first scoped profile, the security monitor proceeds to evaluate the activity against a second scoped profile.

If the activity conforms to at least one of the retrieved profiles but not another adaptive normal profile, then the security monitor generates a notification for the non-conforming process activity at block 609. Since the process activity conforms to normal behavior as expressed by at least one of the adaptive profiles, an alert is not generated. The deviation from at least one of the adaptive normal profiles may be worth investigating at a later time or at least should be logged.

If the activity does not conform to any of the retrieved profiles, then the security monitor generates an abnormal process activity alert for the suspicious process activity at block 611. The alert can include a severity metric based on the expected severity of a possible attack associated with the event data, determined by a model using domain-level knowledge of the endpoints associated with the process or a proportion of event data in the current window conforming to the adaptive normal profiles. The notification can further comprise event data formatted for user display and an indication that the event data corresponds to a notification. A graphical user interface can allow user access to specific event logs for analysis. The alert can further comprise further indications of severity for the alert to be displayed to a user (e.g. a flashing red flight on a user display). If the activity conforms to all retrieved profiles, then control flows to block 613.

At block 613, the security monitor determines whether there is an additional process being monitored. If there is an additional process, flow proceeds to block 602 for evaluation of the next process being monitored. Otherwise, flow returns to the beginning of 602 to newly iterative over the monitored processes with the next window of data.

In addition to facilitating detection of new/unknown threats/attacks, the security monitor can use the adaptive normal profiles to filter out false positives. Alarms generated by a preexisting endpoint security system or event filtering system can be evaluated against relevant adaptive normal profiles before being released or forwarded. With reference to FIG. 3, the preexisting endpoint security system can correspond to the event alert filter 316. FIG. 7 depicts a flowchart of example operations for filtering alarms with adaptive normal process profiles.

At block 701, a security monitor determines a process identifier and an endpoint identifier for an event indicated in a detected alarm. The security monitor can intercept alarms or be an initial sink for an alarm for filtering. The alarm includes activity/event information or references an event identifier that can be used to retrieve the event information. The security monitor then reads the event information to determine the process identifier that identifies a process that caused the event and an endpoint identifier that identifies an endpoint that runs the identified process.

At block 703, the security monitor determines an adaptive normal profile(s) based on the process identifier and the endpoint identifier. Since an adaptive normal profile is identified based on a process identifier and a scoping parameter, the security monitor can query a repository of adaptive normal profiles with a query comprising the process identifier and the endpoint identifier. The repository or repository interface will return one or more adaptive normal profiles that have been previously generated for the process and with a scope that encompasses the endpoint identified by the endpoint identifier. For alarm filtering, the returned adaptive normal profile(s) will have a scope larger than the individual endpoint (e.g., business unit scope, office location scope, subsidiary scope, etc.).

At block 705, the security monitor starts evaluating the event information against each determined adaptive normal profile(s). Adaptive normal profiles may be available locally or retrieved from a remote repository. Assuming multiple adaptive normal profiles have been obtained, the security monitor can begin with either the largest scoped or smallest scoped profile, depending upon configuration of the security monitor.

At block 707, the security monitor determines whether the event indicated by the alarm conforms to the adaptive normal profile being evaluated. All entries of the adaptive normal profile being evaluated will start with a matching process identifier, so the security monitor searches each entry for a corresponding context and target. The security monitor will examine each entry to determine whether the event information conforms to the activity type and a path in the entry. The security monitor may normalize a path indicated in the event information to determine conformance. If the indicated event conforms to the adaptive normal profile, then control flows to block 713. If the indicated event does not conform to the adaptive normal profile, then control flows to block 709.

If the indicated event corresponding to the alarm did not conform to the adaptive normal profile being evaluated, then the security monitor determines whether there is another adaptive normal profile at block 709. If there is one, then the security monitor proceeds to evaluating the event information against the next adaptive normal profile. If not, then control flows to block 715.

At block 713, the security monitor marks the alarm as a possible false positive. Deployments can attribute different levels of trust to the filtering comprising marking alarms. In some cases, the alarm may continue as normal with the possible false positive marker to be a factor in triage of alarms. In other cases, the security monitor logs the marking and discards or disregards the alarm.

At block 715, the security monitor optionally stores an indication that the event indicated by the alarm did not conform to any of the adaptive normal profiles for the process before or while allowing normal processing of the alarm. The indication may record the profiles that were evaluated against the event information. If it turns out the alarm was a false positive, then the profiles may be modified to account for the false positive.

In addition to identifying abnormal process activity at an endpoint that may be malicious, the hierarchically scoped adaptive normal profiles can be used to identify causality chains that propagate and/or potentially conceal abnormal behavior or malicious activity. The event or activity and corresponding process that seems to be the cause of an attack ("direct culprit process") may not be the root of the attack. An attack chain or causality chain allows a direct culprit process to be traced back to a root culprit process. The results of applying adaptive normal profiles can be used to identify causality chains (and, therefore, direct culprit processes), which can be used to train a threat detection model.

Figure 8:
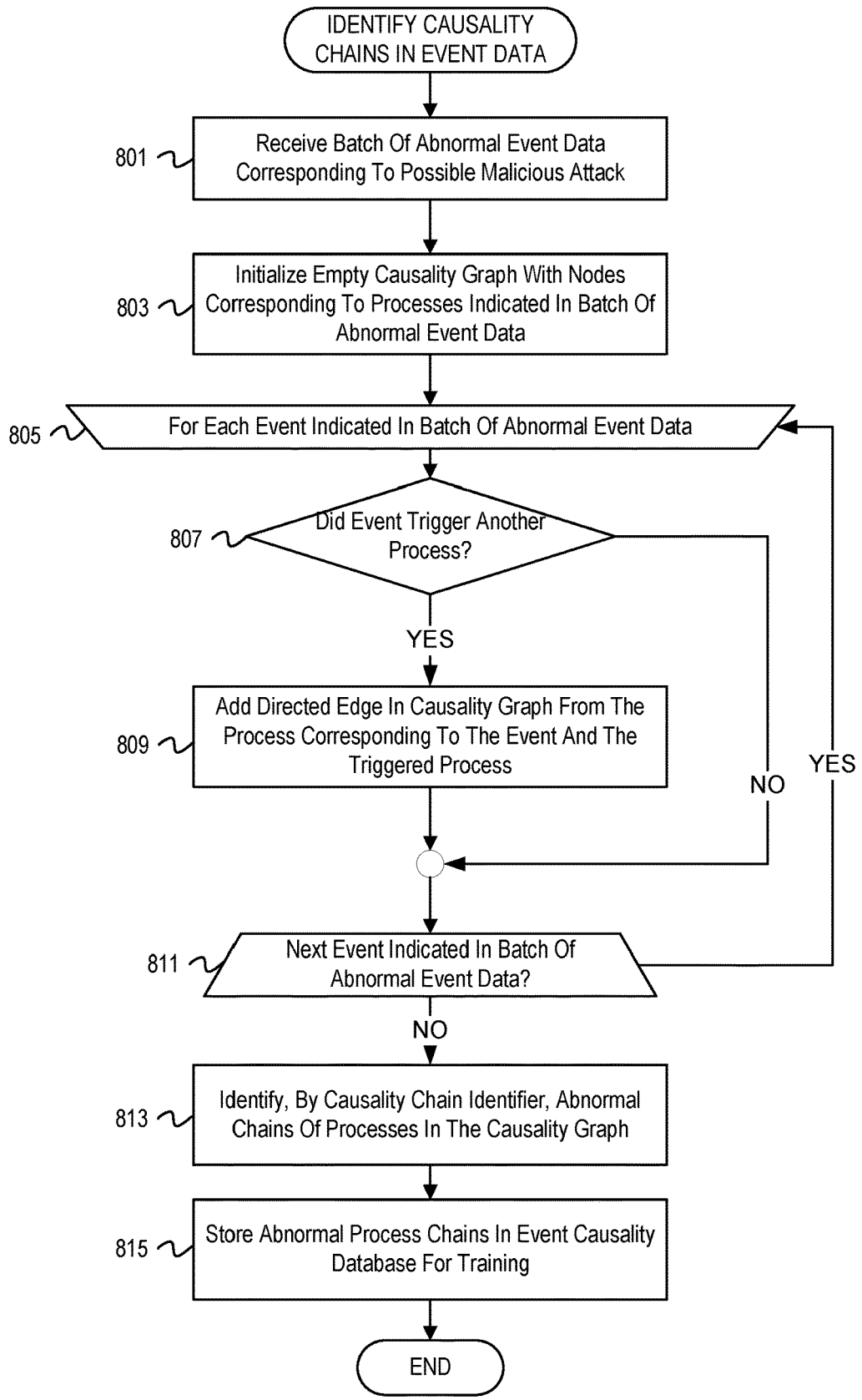
FIG. 8 is a flowchart of example operations for identifying causality chains in event data

FIG. 8 is a flowchart of example operations for identifying causality chains in event data. The FIG. 8 description refers to program code performing the example operations of FIG. 8 as a "causality chain identifier."

At block 801, a causality chain identifier receives a batch of abnormal event data corresponding to a possible malicious attack. The abnormal event data can be generated by adaptive normal profiles corresponding to a notification or alert that indicates a potential malicious attack. The batch of abnormal event data can further comprise a severity metric that measures a proportion of abnormal events from a batch of abnormal event data that generated the abnormal event data, the importance of associated processes or endpoints to endpoint security, etc. and can be from a sliding window in an event data stream.

At block 803, the causality chain identifier initializes an empty causality graph with nodes corresponding to processes indicated in the batch of abnormal event data. The causality chain identifier iterates over the batch of abnormal event data and retrieves a process identifier from each described event, verifies whether the process is already in the causality graph, and, if not, adds the process identifier as a node in the causality graph. Alternatively, the security monitor can add processes as they are triggered at block 807 to avoid adding unnecessary or isolated processes to the causality graph.

At block 805, the causality chain identifier begins iterating over events indicated in the batch of abnormal event data. The events indicated in the batch of abnormal event data are chronologically ordered and/or have timestamps to allow order to be determined. Since the batch of abnormal event data does not include "normal" events, there may be intervening normal events not represented in the batch of event data being processed by the causality chain identifier. The causality chain identifier begins with the earliest abnormal event indicated in the batch of abnormal event data. In some embodiments, the security monitor can receive the batch of abnormal event data in a stream and perform operations in blocks 807 and 809 as event data is received.

At block 807, the causality chain identifier determines whether the event triggered another process. The causality chain identifier can check event data corresponding to the event for an indication of another process triggered by the event. If the event triggered another process, flow continues to block 809. Otherwise, flow skips to block 811.

At block 809, the causality chain identifier adds a directed edge in the causality graph from the process that performed or initiated the event and the process that received a command based on the event. The command can be a command to initiate the process that receives it or a command to execute an action on a running process. If the process is a seed process that was not initiated by another process, the causality chain identifier can add the process to the causality graph with no directed edge. The causality chain identifier can add the process to the causality graph if it has not been previously observed during initialization of the causality graph (for example, if the process is a seed process). If the event data is being received as a stream, the causality chain identifier can store the event data in the causality graph at the directed edge.

At block 811, the causality chain identifier determines whether there is a next event indicated in the batch of abnormal event data. Alternatively, the causality chain identifier can receive an indication from the security monitor that an event data stream has terminated. If no additional events are indicated in the batch of even data, flow proceeds to block 813. Otherwise, flow returns to block 805.

At block 813, the causality chain identifier identifies abnormal chains of processes in the causality graph. The causality chain identifier runs a graph detection algorithm on the causality graph to detect paths. This graph detection algorithm can be as simple as depth or breadth first search that records traversed paths or can be more complex. As a separate subsequent operation, the causality chain identifier classifies the paths as abnormal or normal. Abnormality for causality chains has a contextual meaning that depends on the statistical properties of causality chains from the groups of endpoints corresponding to the causality graph. The causality chain identifier can classify abnormal causality chains by running a statistical model that detects frequent patterns for causality chains given the group of endpoints. Patterns can include a length of the causality chain, types of processes and/or specific processes that generated the events in the causality chain, known behavior for processes running on the group of endpoints, etc. The scope of the statistical model can vary with respect to the scope of the causality chains (and the scopes of adaptive normal profiles that identified abnormal events in the causality chains) depending on computing resources and availability of training data.

The causality chain identifier can be pretrained on causality chains generated on endpoints with substantially similar context with known normal or abnormal behavior. The scope of the group of endpoints can contain the groups of endpoints corresponding to the causality graph and the causality chain identifier can be applied to multiple groups of endpoints. This avoids the need to train many identifiers for a large domain of endpoints. Abnormal event data used to train the causality chain identifier can correspond to a synthetic or real-world attack. A synthetic attack can be performed in a closed network using techniques from known real-world attacks. Real world or synthetic data can be augmented by appropriate randomization to generate more data. For example, identifiers for hierarchical endpoint levels can be randomized within certain identifier ranges, events can be added or removed at random, event severity indicators can be randomized within certain ranges, etc.

At block 815, the causality chain identifier provides the security monitor indications of the abnormal causality chains that have been identified. The identified abnormal causality chains can be used to train a thread detection model. This providing of the abnormal causality chains can be storing them in a database of abnormal causality chains or passing references to the security monitor.

Figure 9:
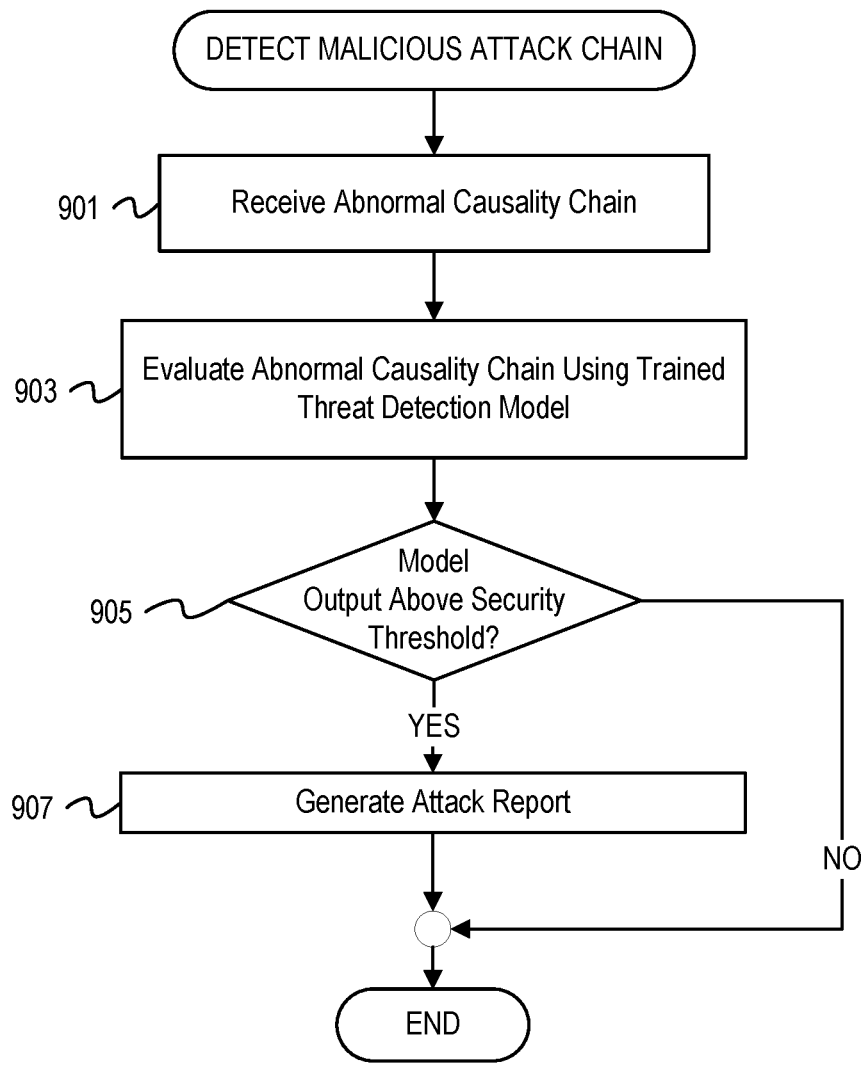
FIG. 9 is a flowchart of example operations for detecting malicious attack chains.

FIG. 9 is a flowchart of example operations for detecting malicious attack chains. The security monitor relies on the abnormal causality chains that have been identified and a threat detection model that has been trained with the abnormal causality chains and benign causality chains.

At block 901, the security monitor receives an abnormal causality chain from a causality chain identifier. The security monitor can format the abnormal causality chain for input into a trained detection model. In embodiments where the trained detection model is a neural network, the security monitor can extract and normalize event features from abnormal event data in the causality chain. Other data formats for different statistical models are possible. Alternatively, the causality chain identifier can be configured to convert the abnormal causality chain into a format appropriate for input to the trained detection model.

At block 903, the security monitor evaluates the abnormal causality chain using a trained detection model. The security monitor feeds the abnormal causality chain into the detection model which outputs a likelihood the abnormal causality chain corresponds to a malicious attack.

At block 905, the security monitor determines whether the abnormal causality chain has a likelihood output from the trained detection model that is above a security threshold. The security threshold can be determined during training of the detection model based on outputs of the detection model for malicious causality chains corresponding to known attacks. If the security monitor determines an abnormal causality chain is likely to correspond to an attack, flow proceeds to block 907. Otherwise, flow terminates.

At block 907, the security monitor generates an attack report corresponding to a (likely) malicious causality chain. The report comprises a descriptor indicating the magnitude of the trained detection model output and records of the abnormal events in the malicious causality chain. These records can be logs stored by a logger, event data processed by the security monitor for user display, etc. The security monitor can send the alert record to a graphical user interface. Operations for the flowchart in FIG. 9 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 403, 405, and 407 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine readable medium that is not a machine-readable storage medium and that can communicate, propagate, or transport a program for use by or in connection with an instruction execution system, apparatus, or device.

The program code/instructions may also be stored in a machine-readable medium that can direct a machine to function in a particular manner, such that the instructions stored in the machine readable medium produce an article of manufacture including instructions which implement the function/act specified in the flowchart and/or block diagram block or blocks.

Figure 10:
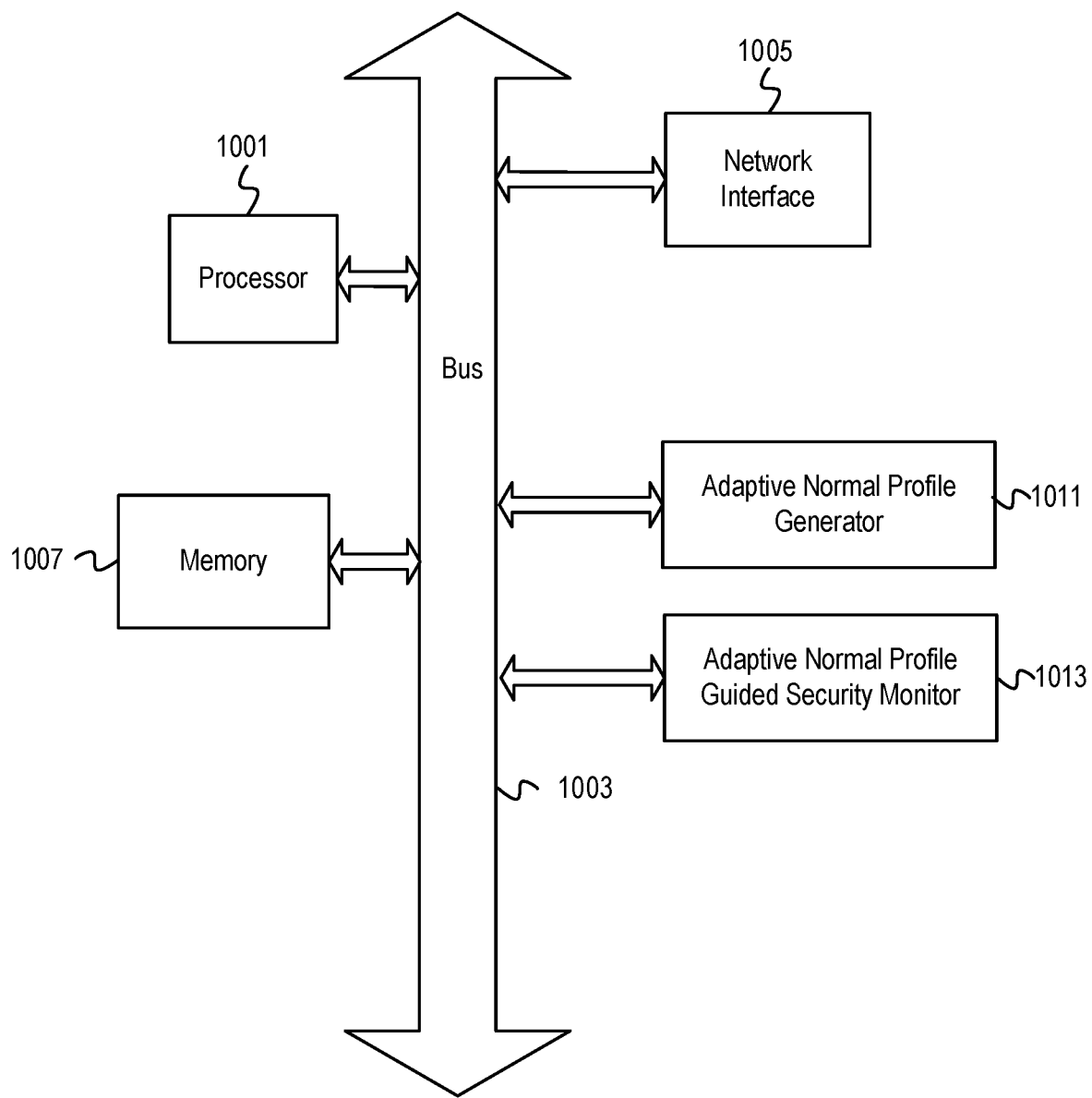
FIG. 10 depicts an example computer with an adaptive normal profile generator and an adaptive normal profile guided security monitor.

FIG. 10 depicts an example computer with an adaptive normal profile generator and an adaptive normal profile guided security monitor. The computer includes a processor 1001 (possibly including multiple processors, multiple cores, multiple nodes, and/or implementing multi-threading, etc.). The computer includes memory 1007, a bus 1003, and a network interface 1005 (e.g., a wireless interface, interface for a wired connection, etc.).

The computer also includes an adaptive normal profile generator 1011 and an adaptive normal profile guided security monitor 1013. The adaptive normal profile generator 1011 generates profiles representing "normal" process activity based on statistical analysis of process events at varying scopes greater than an individual endpoint. The adaptive normal profile guided security monitor 1013 can use the adaptive normal profiles generated by the adaptive normal profile generator 1011 to filter alarms for false positive, detect unknown/undiscovered threats/attacks, and to identify malicious causality chains. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001. The memory 1007 may be system memory or any one or more of the above already described possible realizations of machine-readable media. While depicted as a computer, some embodiments can be any type of device or apparatus to perform operations described herein.

While the aspects of the disclosure are described with reference to various implementations and exploitations, it will be understood that these aspects are illustrative and that the scope of the claims is not limited to them. In general, techniques for detecting malicious attacks on processes running in a network of endpoints as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising,
generating a plurality of profiles for a first process for a plurality of hierarchical endpoint scopes, wherein the first process is executing on one or more endpoints indicated in the plurality of hierarchical endpoint scopes, wherein generating the plurality of profiles for the first process comprises, for each endpoint scope in the plurality of hierarchical endpoint scopes,
determining importance qualifiers for event data for the first process at the endpoint scope;
filtering the event data according to the importance qualifiers;
normalizing the filtered event data to generate normalized event data;
determining, for the first process, a plurality of classifiers for process activities of the first process that satisfy a criterion of normal activity for the first process at the endpoint scope, wherein the determination of the plurality of classifiers for process activities that satisfy the criterion of normal activity is based, at least in part, on statistics from the normalized event data for the first process at the endpoint scope; and
generating a profile with the plurality of classifiers and associating the profile with the endpoint scope.

2. The method of claim 1, further comprising, indicating the normalized event data in association with the endpoint scope.

3. The method of claim 2, wherein normalizing the filtered event data comprises,
determining common file path elements for processes corresponding to the filtered event data; and
replacing file path elements in the filtered event data with corresponding file path elements in the common file path elements.

4. The method of claim 3, wherein the criterion of normal activity for the first process at the endpoint scope comprises a determination that the plurality of classifiers corresponds to events in the normalized event data that indicate common file path elements that are statistically normal in events corresponding to process activity for the first process at the endpoint scope.

5. The method of claim 3, further comprising bucketizing events in the normalized event data according, at least, to file path elements in the common file path elements.

6. The method of claim 2, wherein generating each of the plurality of profiles comprises adding the normalized event data of the corresponding endpoint scope to the profile.

7. The method of claim 1, wherein generating the profile with the plurality of classifiers comprises adding the plurality of classifiers to the profile in association with respective events in a plurality of events from the event data and corresponding event types.

8. A non-transitory, computer-readable medium having program code stored thereon the program code comprising instructions to:
determine first importance qualifiers for first event data corresponding to a first process across a plurality of endpoints that have hosted the first process and second importance qualifiers for second event data of the first process on a first endpoint of the plurality of endpoints;
filter the first event data and second event data according to the first importance qualifiers and the second importance qualifiers, respectively;
normalize the first filtered event data and the second filtered event data to generate first normalized event data and second normalized event data, respectively;
determine, for a first process, a first plurality of classifiers for process activities of the first process that satisfy a first criterion of normal activity for the first process, wherein the determination of the first plurality of classifiers for process activities that satisfy the first criterion of normal activity is based, at least in part, on first statistics from the first normalized event data;

determine, for the first process, a second plurality of classifiers for process activities of the first process that satisfy a second criterion of normal activity for the first process, wherein the determination of the second plurality of classifiers for process activities that satisfy the second criterion of normal activity is based, at least in part, on second statistics from the second normalized event data;

generate a first profile with the first plurality of classifiers and associate the first profile with a first hierarchical scope that encompasses the plurality of endpoints; and generate a second profile with the second plurality of classifiers and associate the second profile with a second hierarchical scope that only encompasses the first endpoint.

9. The computer-readable medium of claim 8, wherein the instructions to determine the first plurality of classifiers comprise instructions to determine common file paths corresponding to event data for the first process based, at least in part, on the first statistics from event data corresponding to the first process across a plurality of endpoints that have hosted the first process.

10. The computer-readable medium of claim 9, wherein the instructions to determine, for the first process, the first plurality of classifiers for process activities of the first process that satisfy the first criterion of normal activity for the first process comprise instructions to determine that file path elements corresponding to the first plurality of classifiers are indicated in the common file paths.

11. The computer-readable medium of claim 9, wherein the instructions to determine the first plurality of classifiers further comprise instructions to determine file types corresponding to common file paths for the first process.

12. The computer-readable medium of claim 9, wherein the first criterion of normal activity comprises a determination that the common file paths are statistically normal in events corresponding to process activity of the first process on the plurality of endpoints.

13. The computer-readable medium of claim 9, wherein the instructions to generate a first profile with the first plurality of classifiers comprise instructions to add the common file paths to the first profile.

14. The computer-readable medium of claim 9,
wherein the instructions to normalize the first filtered event data comprise instructions to normalize the first filtered event data according to common file path elements indicated in the first filtered event data, wherein the common file paths comprise the common file path elements, wherein the first statistics from the event data at least comprise statistics of file path elements indicated in the first filtered event data.

15. An apparatus comprising:
a processor; and
a non-transitory machine-readable medium having instructions stored thereon that are executable by the processor to cause the apparatus to,
determine first importance qualifiers for first event data corresponding to a first process across a plurality of endpoints that have hosted the first process and second importance qualifiers for second event data of the first process on a first endpoint of the plurality of endpoints;
filter the first event data and second event data according to the first importance qualifiers and the second importance qualifiers, respectively;
normalize the first filtered event data and the second filtered event data to generate first normalized event data and second normalized event data, respectively;

determine, for a first process, a first plurality of classifiers for process activities of the first process that satisfy a first criterion of normal activity for the first process, wherein the determination of the first plurality of classifiers for process activities that satisfy the first criterion of normal activity is based, at least in part, on first statistics from the first normalized event data corresponding to the first process across a plurality of endpoints that have hosted the first process;

determine, for the first process, a second plurality of classifiers for process activities of the first process that satisfy a second criterion of normal activity for the first process, wherein the determination of the second plurality of classifiers for process activities that satisfy the second criterion of normal activity is based, at least in part, on second statistics from the second normalized event data corresponding to the first process on a first endpoint of the plurality of endpoints;

generate a first profile with the first plurality of classifiers and associate the first profile with a first hierarchical scope that encompasses the plurality of endpoints; and generate a second profile with the second plurality of classifiers and associate the second profile with a second hierarchical scope that only encompasses the first endpoint.

16. The apparatus of claim 15, wherein the instructions executable by the processor to cause the apparatus to determine the first plurality of classifiers comprise instructions to determine common file paths corresponding to event data for the first process based, at least in part, on the first statistics from event data corresponding to the first process across a plurality of endpoints that have hosted the first process.

17. The apparatus of claim 16, wherein the instructions executable by the processor to cause the apparatus to determine, for the first process, the first plurality of classifiers for process activities of the first process that satisfy the first criterion of normal activity for the first process comprise instructions to determine that file path elements corresponding to the first plurality of classifiers are indicated in the common file paths.

18. The apparatus of claim 16, wherein the instructions executable by the processor to cause the apparatus to determine the first plurality of classifiers further comprise instructions to determine file types corresponding to common file paths for the first process.

19. The apparatus of claim 16, wherein the first criterion of normal activity comprises a determination that the common file paths are statistically normal in events corresponding to process activity of the first process on the plurality of endpoints.

20. The apparatus of claim 16, wherein the instructions to normalize the first filtered event data comprise instructions executable by the processor to cause the apparatus to:
normalize the first filtered event data according to common file path elements indicated in the first filtered event data, wherein the common file paths comprise the common file path elements, wherein the first statistics from the first filtered event data at least comprise statistics of file path elements indicated in the first filtered event data.

* * * * *

UNITED STATES PATENT AND TRADEMARK OFFICE
CERTIFICATE OF CORRECTION

PATENT NO. : 11,888,881 B2
APPLICATION NO. : 17/931253
DATED : January 30, 2024
INVENTOR(S) : Shai Meir et al.

It is certified that error appears in the above-identified patent and that said Letters Patent is hereby corrected as shown below:

In the Specification

Column 7, Line 35, the word "receives", should read --received--

Signed and Sealed this
Twenty-seventh Day of February, 2024

*Katherine Kelly Vidal*

Katherine Kelly Vidal
*Director of the United States Patent and Trademark Office*